United States Patent
Yamaguchi et al.

(10) Patent No.: US 7,103,483 B2
(45) Date of Patent: Sep. 5, 2006

(54) FLUID ANALYZING APPARATUS, FLUID ANALYZING METHOD, AND FLUID ANALYZING PROGRAM

(75) Inventors: Yoshihiro Yamaguchi, Saitama (JP); Toshiyuki Arima, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 11/016,470

(22) Filed: Dec. 17, 2004

(65) Prior Publication Data

US 2005/0165562 A1 Jul. 28, 2005

(30) Foreign Application Priority Data

Dec. 26, 2003 (JP) ............... 2003-433718

(51) Int. Cl.
 *G06F 19/00* (2006.01)
 *G01N 11/00* (2006.01)
(52) U.S. Cl. .......................... 702/50; 702/47
(58) Field of Classification Search ............... 702/45, 702/47, 49, 50, 61, 81, 100, 138, 182, 147; 73/1.16, 1.57, 152.18; 703/2, 9
 See application file for complete search history.

(56) References Cited

U.S. PATENT DOCUMENTS 5,801,969 A * 9/1998 Nagahama ................. 703/9
6,915,245 B1 * 7/2005 Hinton et al. ............... 703/2

FOREIGN PATENT DOCUMENTS

JP 2002-312342 10/2002

OTHER PUBLICATIONS

Sawada, Keisuke, "The Fundamentals and Latest Topics of CFD for Compressive Flows", Extension Lecture of Department of Aeronautics and Astronautics "Cutting Edge of Numerical Hydrodynamics", Oct. 11-12, 2001, pp. 1-18.
CIP Introductory, "Simulation Summer School of Celestial Body and Space Plasma", Sep. 11 to Sep. 15, 2002, pp. 1-18.
Akamatsu, Mikio, et al., Computational Method Based on a Quasi-Conservative Formulation for Fluid Flows Under Arbitrary Mach Number Condition, pp. 82-89.

* cited by examiner

*Primary Examiner*—Bryan Bui
(74) *Attorney, Agent, or Firm*—Fenwick & West LLP (57) ABSTRACT

Fluid analyzing apparatus includes: an advection step density analyzing unit; an advection step internal energy analyzing unit; and an advection step pressure analyzing unit. The apparatus further includes: an advection step velocity analyzing unit; a nonadvection step small perturbation analyzing unit; and a nonadvection step velocity analyzing unit. The apparatus further includes: a nonadvection step density analyzing unit; a nonadvection step internal energy analyzing unit; and an iterative calculation control unit which iterates calculation in a predetermined order.

12 Claims, 7 Drawing Sheets

FLUID ANALYZING APPARATUS, FLUID ANALYZING METHOD, AND FLUID ANALYZING PROGRAM

RELATED APPLICATION

This application claims the benefit under 35 U.S.C. § 119 of Japanese patent application No. 2003-433718 filed on Dec. 26, 2003 and incorporated in the entirety herein by this reference thereto.

TECHNICAL FIELD

The present invention relates a fluid analyzing apparatus, a fluid analyzing method, and a fluid analyzing program which can unifiedly numerically analyze an incompressible fluid and a compressible fluid.

BACKGROUND OF THE INVENTION

In general, numerical analysis of an incompressible fluid and numerical analysis of a compressible fluid are performed by using different fluid analyzing apparatuses or separate fluid analyzing methods.

Although not general, there is a unified analyzing method for an incompressible fluid and a compressible fluid. The unified analyzing method for an incompressible fluid and a compressible fluid are classified by the following three types. A method of the first type extends a solution of an incompressible fluid to make it possible to analyze a compressible fluid. A method of the second type subjects a solution of an incompressible fluid to a preconditioning matrix to make it possible to analyze an incompressible fluid. A method of the third type is an analyzing method which advects a physical quantity by a nonconservative discrete equation as in a CIPCUP (CCUP) method (for example, see CIP introductory, "Simulation Summer School of Celestial Body and Space Plasma" document, Sep. 11 to Sep. 15, 2002) or a QCAM method (for example, see Mikiya AKAMATSU et al., "Computational Method Based On a Quasi-Conservative Formulation for Fluid Flows under Arbitrary Mach Number Condition", Transactions of the Japan society of mechanical engineers, (Ser. B), Vol. 69, No.682 (June 2003), pp. 1386 to 1393).

The reasons why a unified analyzing method for an incompressible fluid and a compressible fluid is not general are as follows. That is, the method of the first type cannot analyze an unsteady fluid with time developing. The method of the second type depends on nonphysical parameters in a preconditioning matrix. In the method of the third type, an iterative calculation performed in pressure calculation is deteriorated in convergence and makes a calculation load large.

The reason why the convergence of an iterative calculation is deteriorated will be described below. In general, an error caused by a numerical calculation occurs because the number of significant figures of a fluid analyzing apparatus is finite and because a calculation using an iterative solution is terminated at a finite number of times. Since the number of significant figures is finite, when the number of calculations increases, errors caused by a cutoff value following the significant digit are accumulated. In the iterative method, a solution is expected to be converged. However, when the calculation is terminated at a finite number of times, errors occur. These errors deteriorate the convergence of the iterative calculation.

As a patent document which discloses an analyzing method (in which an advection term and a nonadvection term are separated from each other) for advecting physical quantity by a nonconservative discrete equation, Japanese Patent Application Laid-Open No. 2002-312342 (the 62nd and 65th paragraphs FIG. 4, and the like) or the like is known.

SUMMARY OF THE INVENTION

Therefore, there are needs of a fluid analyzing apparatus, a fluid analyzing method, and a fluid analyzing program which can analyze an unsteady fluid with time developing, which do not depend on nonphysical parameters, and which can perform calculation with good convergence.

A fluid analyzing apparatus according to the present invention, includes: an advection step density analyzing unit which uses an advection equation of a mass conservation equation to calculate a density in an advection step; an advection step internal energy analyzing unit which uses an advection equation of an internal energy equation to calculate an internal energy in the advection step; and an advection step pressure analyzing unit which calculates a pressure developing after advection based on the density and the internal energy in the advection step. The fluid analyzing apparatus according to the present invention, further includes: an advection step velocity analyzing unit which uses an equation obtained by adding a term of pressure gradient developing before advection to an advection equation of a momentum conservation equation to calculate a velocity in an advection step; a nonadvection step small perturbation analyzing unit which calculates a small perturbation from the pressure developing after advection in a nonadvection step based on the density, the internal energy, the pressure, and the velocity after the advection step; and a nonadvection step velocity analyzing unit which calculates a velocity developing after a unit time has elapsed based on the small perturbations in the advection step and the nonadvection step. The fluid analyzing apparatus according to the present invention, further including: a nonadvection step density analyzing unit which calculates a density developing after a unit time has elapsed based on the velocity developing after the unit time has elapsed and the density in the advection step; a nonadvection step internal energy analyzing unit which calculates an internal energy developing after the unit time has elapsed based on the velocity developing after the unit time has elapsed and the density in the advection step; and an iterative calculation control unit which iterates calculations performed from the advection step density analyzing unit to the nonadvection step internal energy analyzing unit in a predetermined order.

A fluid analyzing method according to the present invention causes a fluid to be analyzed by a fluid analyzing apparatus including an advection step density analyzing unit, an advection step internal energy analyzing unit, an advection step pressure analyzing unit, an advection step velocity analyzing unit, a nonadvection step small perturbation analyzing unit, a nonadvection step velocity analyzing unit, a nonadvection step density analyzing unit, a nonadvection step internal energy analyzing unit, and an iterative calculation control unit. A fluid analyzing method according to the present invention, includes: the step of causing the advection step density analyzing unit to use an advection equation of a mass conservation equation to calculate a density in an advection step; the step of causing the advection step internal energy analyzing unit to use an advection equation of an internal energy equation to calculate an internal energy in the advection step; and the step of causing the advection step pressure analyzing unit to calculate a pressure developing after advection based on the density and the internal energy in the advection step. A fluid analyzing method according to the present invention, further includes: the step of causing the advection step velocity analyzing unit to use an equation obtained by adding a term of pressure gradient developing before advection to an advection equation of a momentum conservation equation to calculate a velocity in an advection step; the step of causing the nonadvection step small perturbation analyzing unit to calculate a small perturbation from the pressure developing after advection in a nonadvection step based on the density, the internal energy, the pressure, and the velocity after the advection step; and the step of causing the nonadvection step velocity analyzing unit to calculate a velocity developing after a unit time has elapsed based on the small perturbations in the advection step and the nonadvection step. A fluid analyzing method according to the present invention, further includes: the step of causing the nonadvection step density analyzing unit to calculate a density developing after a unit time has elapsed based on a velocity developing after the unit time has elapsed and a density in an advection step; the step of causing the nonadvection step internal energy analyzing unit to calculate an internal energy developing after the unit time has elapsed based on the velocity developing after the unit time has elapsed and the density in the advection step; and the step of causing the iterative calculation control unit to iterate calculations performed from the advection step density analyzing unit to the nonadvection step internal energy analyzing unit in a predetermined order.

A fluid analyzing program according to the present invention causes a fluid to be analyzed by a fluid analyzing apparatus including an advection step density analyzing unit, an advection step internal energy analyzing unit, an advection step pressure analyzing unit, an advection step velocity analyzing unit, a nonadvection step small perturbation analyzing unit, a nonadvection step velocity analyzing unit, a nonadvection step density analyzing unit, a nonadvection step internal energy analyzing unit, and an iterative calculation control unit. A fluid analyzing program according to the present invention, includes: the step of causing the advection step density analyzing unit to use an advection equation of a mass conservation equation to calculate a density in an advection step; the step of causing the advection step internal energy analyzing unit to use an advection equation of an internal energy equation to calculate an internal energy in the advection step; and the step of causing the advection step pressure analyzing unit to calculate a pressure developing after advection based on the density and the internal energy in the advection step. The fluid analyzing program according to the present invention, further includes: the step of causing the advection step velocity analyzing unit to use an equation obtained by adding a term of pressure gradient developing before advection to an advection equation of a momentum conservation equation to calculate a velocity in an advection step; the step of causing the nonadvection step small perturbation analyzing unit to calculate a small perturbation from the pressure developing after advection in a nonadvection step based on the density, the internal energy, the pressure, and the velocity after the advection step; and the step of causing the nonadvection step velocity analyzing unit to calculate a velocity developing after a unit time has elapsed based on the small perturbations in the advection step and the nonadvection step. A fluid analyzing program according to the present invention, further includes: the step of causing the nonadvection step density analyzing unit to calculate a density developing after a unit time has elapsed based on the velocity developing after the unit time has elapsed and the density in the advection step; the step of causing the nonadvection step internal energy analyzing unit to calculate an internal energy developing after the unit time has elapsed based on the velocity developing after the unit time has elapsed and the density in the advection step; and the step of causing the iterative calculation control unit to iterate calculations performed from the advection step density analyzing unit to the nonadvection step internal energy analyzing unit in a predetermined order.

In the present invention, in calculation of a pressure, a small perturbation of a pressure developing after advection is calculated. Since a numerical error is in proportion to a value of a variable, precision of a pressure obtained by calculating small perturbation is higher than precision of a pressure obtained by calculating pressure itself. Therefore, the convergence of the calculation is improved.

According to one aspect of the present invention, when the advection step density analyzing unit and the advection step internal energy analyzing unit use an advection equation to perform calculation, approximated Riemann's solvers are applied. Therefore, an advection can be efficiently calculated.

According to another aspect of the present invention, the advection step pressure analyzing unit uses a relational expression of ideal gases to calculate a pressure developing after advection based on a density and an internal energy in an advection step. Therefore, a pressure developing after advection can be easily calculated.

According to still another aspect of the present invention, the nonadvection step small perturbation analyzing unit uses a Poisson's equation of a small perturbation. Therefore, the small perturbation can be calculated by a method of numerically analyzing a Poisson's equation.

DETAILED DESCRIPTION OF THE PREFERRED EMBODIMENTS

Figure 1:
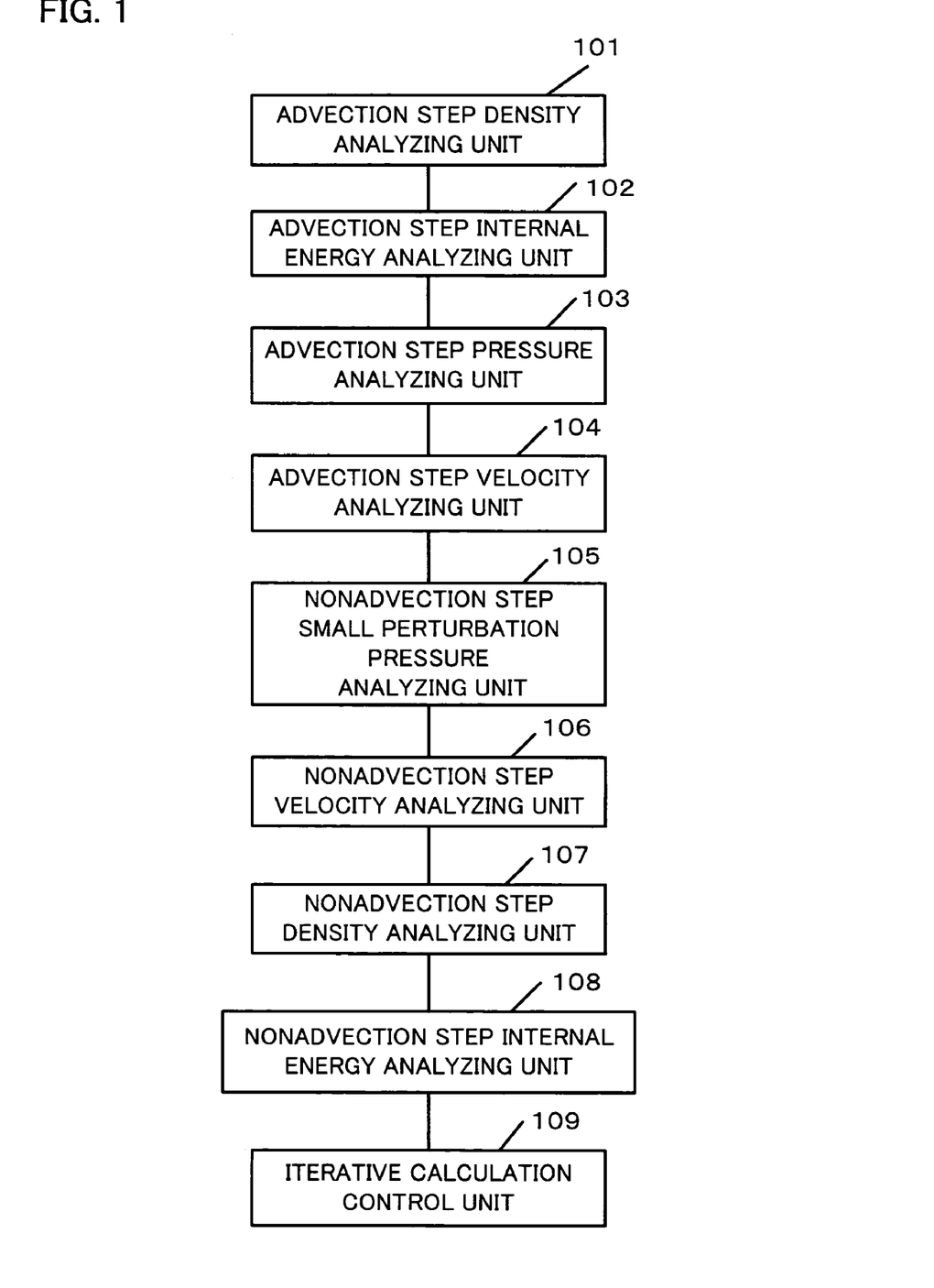
FIG. 1 is a block diagram showing a configuration of a fluid analyzing apparatus according to an embodiment of the present invention.

FIG. 1 shows a configuration of a fluid analyzing apparatus according to an embodiment of the present invention. The fluid analyzing apparatus according to the embodiment of the present invention iteratively calculates a series of equations representing physical laws in space by numerical analysis to perform analysis. A series of calculations is performed every unit time, and the series of calculations is iterated. In addition, in the fluid analyzing apparatus according to the embodiment of the present invention, a series of calculations performed every unit time in an advection is separated from a series of calculations performed every unit time in a nonadvection. An analyzing method will be described later.

The fluid analyzing apparatus according to the embodiment of the present invention includes an advection step density analyzing unit 101, an advection step internal energy analyzing unit 102, an advection step pressure analyzing unit 103, and an advection step velocity analyzing unit 104. The advection step density analyzing unit 101 calculates a change in density developing after advection. The advection step internal energy analyzing unit 102 calculates a change in internal energy developing after advection. The advection step pressure analyzing unit 103 calculates a pressure developing after advection based on the density developing after advection and the internal energy which are calculated by the advection step density analyzing unit 101 and the advection step internal energy analyzing unit 102, respectively. The advection step velocity analyzing unit 104 calculates a velocity developing after advection in consideration of a pressure gradient at the present time.

The fluid analyzing apparatus according to the embodiment of the present invention further includes a nonadvection step small perturbation analyzing unit 105, a nonadvection step velocity analyzing unit 106, a nonadvection step density analyzing unit 107, a nonadvection step internal energy analyzing unit 108, and an iterative calculation control unit 109. The nonadvection step small perturbation analyzing unit 105 calculates a small perturbation developing after a unit time has elapsed based on a small perturbation, a velocity, a density, and an internal energy in the advection step calculated by units from the advection step density analyzing unit 101 to the advection step velocity analyzing unit 104. The nonadvection step velocity analyzing unit 106 calculates a velocity developing after the unit time has elapsed based on the small perturbation developing after the unit time has elapsed, calculated by the nonadvection step small perturbation analyzing unit 105. The nonadvection step density analyzing unit 107 calculates a density developing after the unit time has elapsed based on a velocity or the like developing after the unit time has elapsed, calculated by the nonadvection step velocity analyzing unit 106. The nonadvection step internal energy analyzing unit 108 calculates an internal energy after the unit time has elapsed based on a velocity or the like developing after the unit time has elapsed, calculated by the nonadvection step velocity analyzing unit 106. The iterative calculation control unit 109 controls an iterative calculation performed every unit time to end the process when a predetermined period of time has elapsed or when a residual error of a variation has become sufficiently small.

In the fluid analyzing apparatus according to the embodiment of the present invention, Navier-Stokes equations which serve as a series of conservation equations representing physical laws in space and which represent a fluid can be generally expressed as follows:

$$\partial \rho/\partial t + \nabla \cdot \rho u = 0 \tag{1}$$

$$\partial \rho u/\partial t + \nabla \cdot \rho u = \nabla \cdot (-pI + \tau) \tag{2}$$

$$\partial E/\partial t + \nabla \cdot (E+p)u = -\nabla \cdot q + \nabla(\tau \cdot u) \tag{3}$$

Equation (1) is a mass conservation equation, Equation (2) is a momentum conservation equation, and Equation (3) is an energy conservation equation. In this state, as the mass conservation equation, the following Equation (4) is obtained by decomposing the derivation of Equation (1). As the momentum conservation equation, Equation (5) is obtained by substituting Equation (1) into Equation (2). In addition, as the energy conservation equation, Equation (6) is obtained by substituting Equation (1) and Equation (2) into Equation (3).

$$\partial \rho/\partial t + u \cdot \nabla \rho = -\rho \nabla \cdot u \tag{4}$$

$$\partial u/\partial t + u \nabla \cdot u = (1/\rho) \nabla \cdot (-pI + \tau) \tag{5}$$

$$\partial e/\partial t + u \cdot \nabla e = (1/\rho)[-p(\nabla \cdot u) - \nabla \cdot q + \tau : \nabla u] \tag{6}$$

where, $\rho$ denotes a density, u denotes a velocity vector, E denotes a total energy per unit volume, e denotes an internal energy per unit mass, and p denotes a pressure. $\tau$ denotes a viscous stress tensor, and q denotes a heat transfer flow velocity vector. I denotes a unit matrix. A relationship between the total energy E per unit volume and the internal energy per unit mass can be represented by the following equation. In this specification, the internal energy per unit volume is called an internal energy.

$$E = \rho(e + u^2/2)$$

Figure 2:
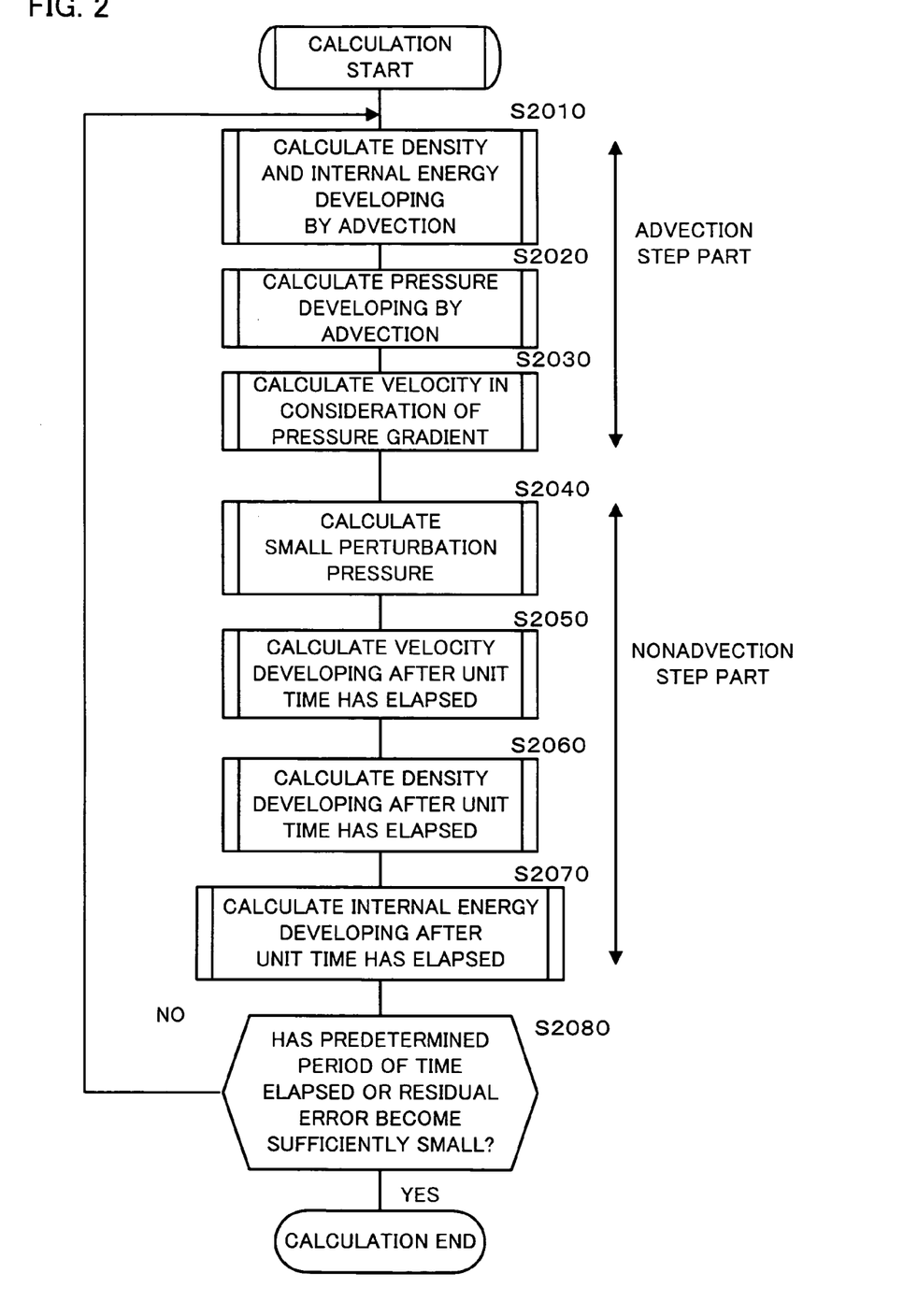
FIG. 2 is a flow chart for explaining an operation of the fluid analyzing apparatus according to the embodiment of the present invention.

An operation of the fluid analyzing apparatus according to the embodiment of the present invention will be described below with reference to the flow chart in FIG. 2.

In step S2010, the advection step density analyzing unit 101 and the advection step internal energy analyzing unit 102 calculate a density and an internal energy in an advection step, respectively. These calculations are performed by the following advection equations:

$$\partial \rho/\partial t\ 30\ u \cdot \nabla \rho = 0 \tag{7}$$

$$\partial e/\partial t + u \cdot \nabla e = 0 \tag{8}$$

Equation (7) and Equation (8) are obtained by make the right-side members of Equation (4) and Equation (6) zero, respectively. Equation (7) and Equation (8) represents advections of a density and an internal energy, respectively. More specifically, Equation (7) and Equation (8) mean that the profiles of the density and the energy make translational movement at a velocity u. A numerical analysis of an advection can be effectively performed by using approximated Riemann's solvers. The approximated Riemann's solvers include a flux difference splitting method, a flux vector splitting method, and the like. With respect to the approximated Riemann's solvers, for example, see Keisuke SAWADA, "The fundamentals and Latest Topics of CFD of Compressive Flow", Extension Lecture of Department of Aeronautics and Astronautics "Cutting Edge of Numerical Hydrodynamics", Oct. 11, 2001 to Oct. 12, 2001. In this case, a density and an internal energy developing after advection are expressed by:

$$\rho^{n+1/2}$$

$$e^{n+1/2}$$

In the following description, a variable at the start of calculation is denoted by n (superscript), a variable developing after advection is denoted by n+½ (superscript), and a variable developing after a unit time has elapsed is denoted by n+1 (superscript).

In step S2020, the advection step pressure analyzing unit 103 substitutes the density of $\rho^{n+1/2}$ and the internal energy of $e^{n+1/2}$ developing after advection into the equation of state given by the following equation:

$$p = (\gamma - 1)\rho e \qquad (9)$$

where $\gamma$ is a specific heat ratio.

and then calculates a pressure $p^{n+1/2}$ developing after advection.

In step S2030, the advection step velocity analyzing unit 104 calculates a velocity developing after advection based on the following equation:

$$u^{n+1/2} - u^n = (\Delta t)[-u^n \nabla \cdot u^n + \nabla \cdot (-p^n I)/\rho^n] \qquad (10)$$

Equation (10) is obtained by leaving only the term of a pressure gradient of the right-side member of Equation (5). The following steps S2010 to S2030 correspond to processes in the advection step.

In step S2040, the nonadvection step small perturbation analyzing unit 105 calculates a small perturbation from the pressure $p^{n+1/2}$ developing after advection.

An equation for calculating the small perturbation is introduced here. Values except for advection steps in Equations 4 to 6 are calculated to obtain the following equations:

$$\rho^{n+1} - \rho^{n+1/2} = -\Delta t \rho^{n+1/2} \nabla \cdot u^{n+1} \qquad (11)$$

$$u^{n+1} - u^{n+1/2} = (\Delta t/\rho^{n+1/2})[-\nabla \cdot (\phi^{n+1} + \phi^{n+1/2})I + \nabla \cdot \tau] \qquad (12)$$

$$e^{n+1} - e^{n+1/2} = (\Delta t/\rho^{n+1/2})[-p^{n+1/2}(\nabla \cdot u^{n+1}) - \nabla \cdot q + \tau : \nabla u^{n+1}] \qquad (13)$$

where $$\phi^{n+1} = p^{n+1} - p^{n+1/2}$$

$$\phi^{n+1/2} = p^{n+1/2} - p^n$$

From Equation (9)

$$\phi^{n+1} = (\gamma - 1)[e^{n+1/2}(\rho^{n+1} - \rho^{n+1}) + \rho^{n+1/2}(e^{n+1} - e^{n+1/2})] \qquad (14)$$

Equation (11) and Equation (13) are substituted into Equation (14), and Equation (12) is substituted into Equation (14) to calculate the following small perturbation Poisson's equation:

$$\nabla^2 \phi^{n+1} = RHS \qquad (15)$$

where RHS is a function including $\phi^{n+1}$ and variables which have been calculated in the advection step.

Figure 3:
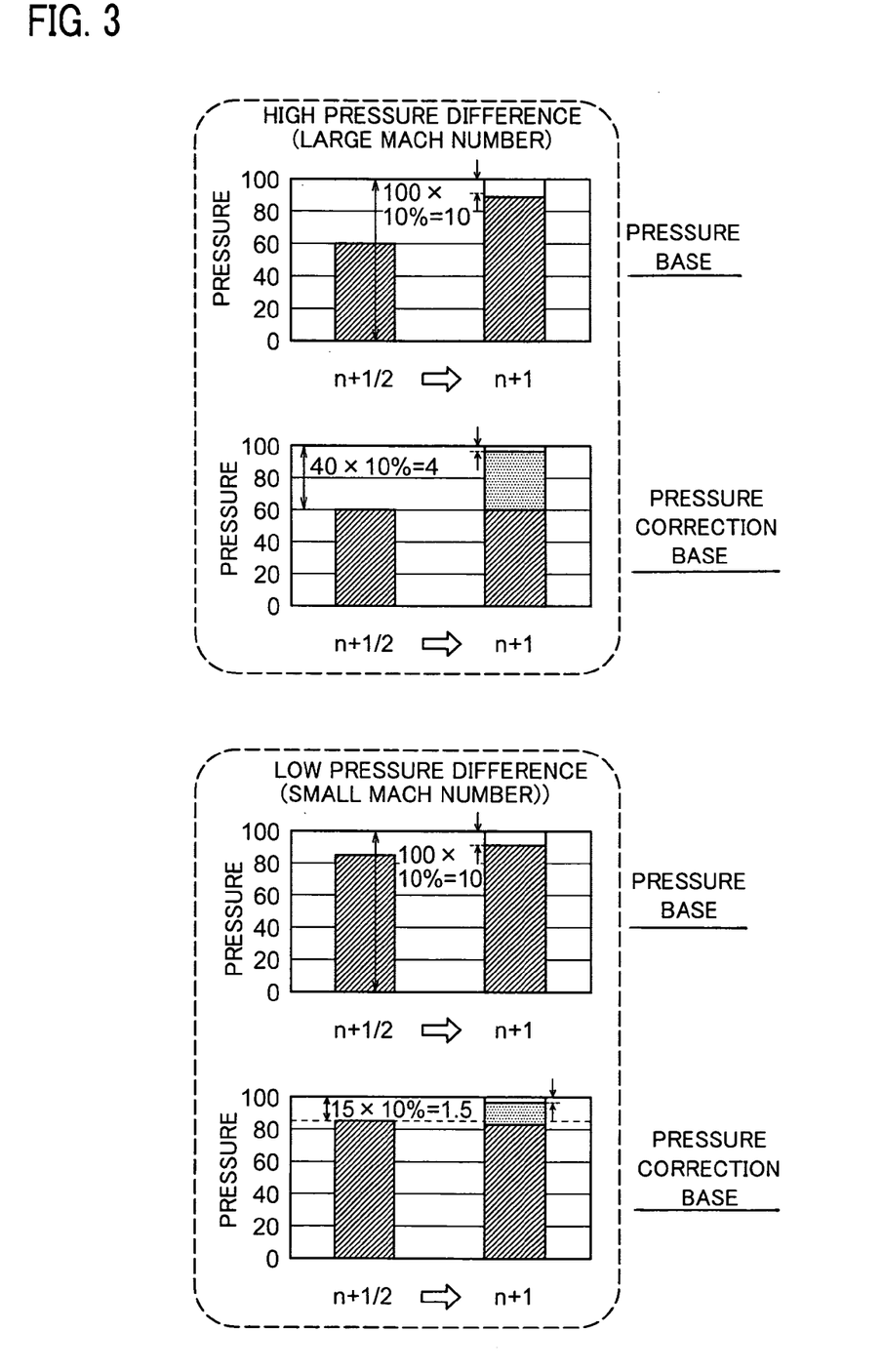
FIG. 3 shows graphs of numerical errors occurring when a pressure is selected as a variable and when a small perturbation is selected as a variable.
Figure 4:
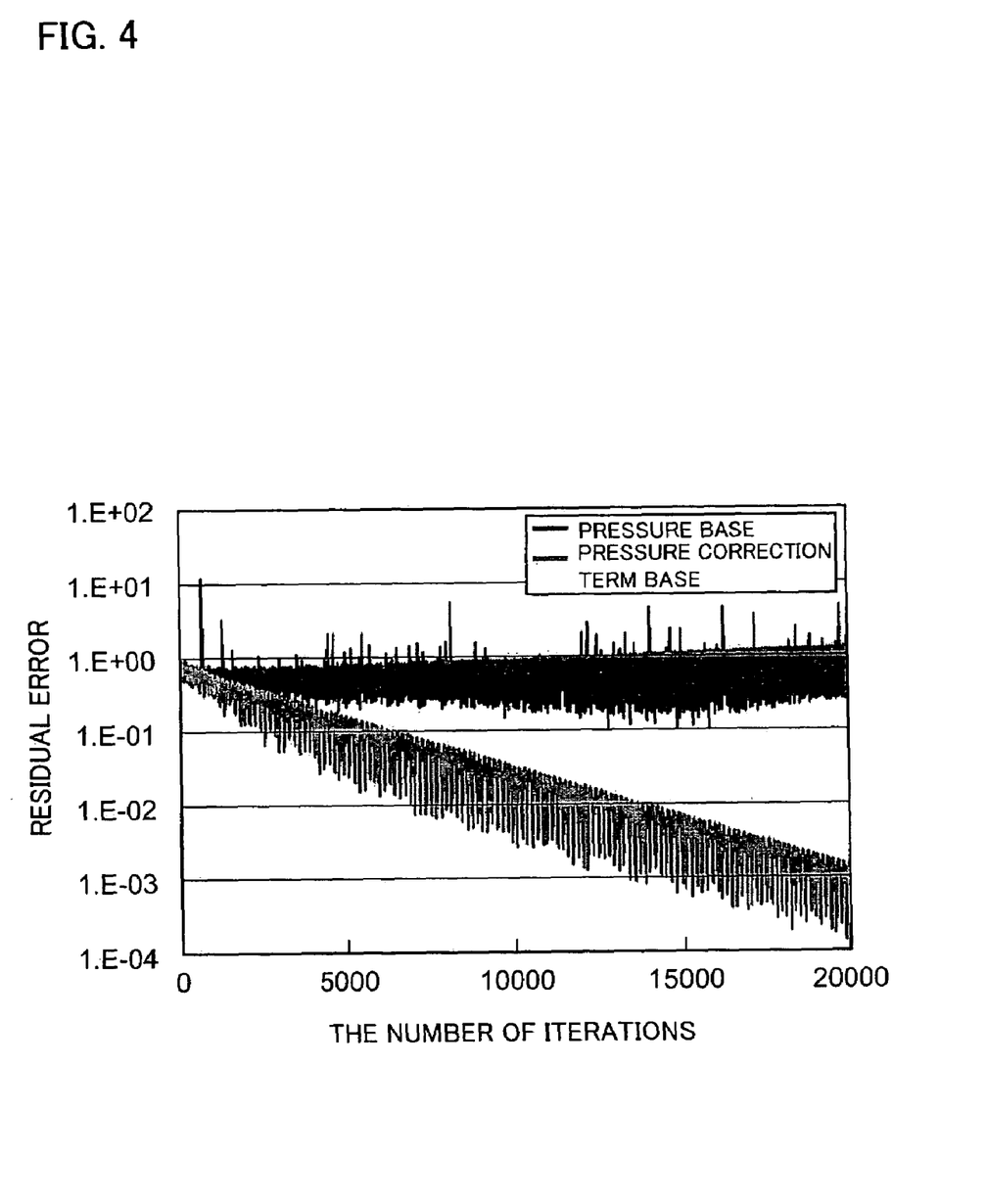
FIG. 4 is a graph showing a convergence history of a solution obtained when a pressure is selected as a variable and a solution obtained when a variation of a pressure is made a variable (pressure correction term base), where a Mach number is 0.01.

The nonadvection step small perturbation analyzing unit 105 numerically solves the pressure Poisson's equation given by Equation (15) to calculate a value $\phi^{n+1}$. It should be noted that the value $\phi^{n+1}$ is a small perturbation from a pressure developing after advection. In FIG. 3, a hatched portion of a bar graph indicates a calculation value of a pressure, a dotted portion indicates a calculation value of the small perturbation pressure, and a white-ground portion denotes a numerical error. Since the number of signification digits of the fluid analyzing apparatus is fixed, the numerical error is in proportion to a value of a variable which is pressure or small perturbation. Therefore, precision of a pressure obtained by calculating small perturbation is higher than precision of pressure obtained by calculating pressure itself. In particular, when a small Mach number at which a pressure variable is small is set, the effect is great. In FIG. 3, a numerical error is set at 10% of the variable. FIG. 4 shows a convergence history of solutions obtained when a pressure is used as a variable and when a perturbation of a pressure is used as a variable (pressure correction term base). With an increase in number of iterations, convergence advances in the latter. However, in the former, convergence does not advance.

In step S2050, the nonadvection step velocity analyzing unit 106 substitutes the value $\phi^{n+1}$ calculated by the nonadvection step small perturbation analyzing unit 105 into Equation (12) to calculate $u^{n+1}$.

In step S2060, the nonadvection step density analyzing unit 107 substitutes the value $u^{n+1}$ calculated by the nonadvection step velocity analyzing unit 106 into Equation (11) to calculate $\rho^{n+1}$.

In step S2070, the nonadvection step internal energy analyzing unit 108 substitutes the value $u^{n+1}$ calculated by the nonadvection step velocity analyzing unit 106 into Equation (13) to calculate $e^{n+1}$. The processes in steps S2040 to S2070 are those in the advection step.

In step S2080, the iterative calculation control unit 109 ends the analyzing process when a predetermined period of time has elapsed or when a residual error of the variables, i.e., differences between the variables in this step and those in the previous step has become sufficiently small, otherwise, the iterative calculation control unit 109 returns the analyzing process to step S2010.

$$\Sigma\{|\rho^{n+1} - \rho^n| + |u^{n+1} - u^n| + |e^{n+1} - e^n|\}$$

Results of calculations performed by using the fluid analyzing apparatus according to the embodiment of the present invention, will be described below.

Figure 5:
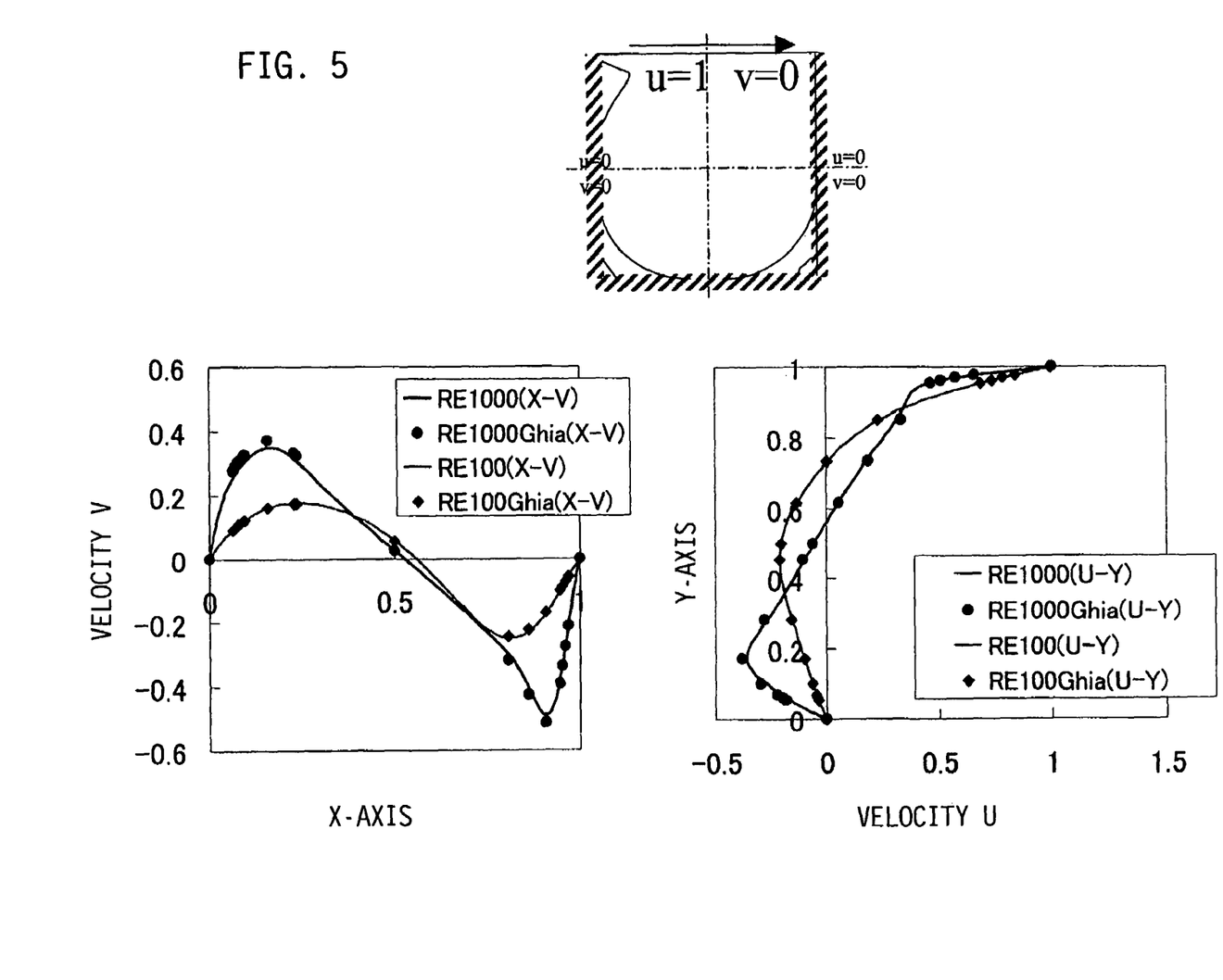
FIG. 5 shows graphs showing results obtained by applying the present invention to a so-called cavity problem.

FIG. 5 shows results obtained by applying the present invention to a so-called cavity problem which is a viscosity problem of a fluid having a small Reynolds number and a small Mach number. FIG. 5 shows results obtained when a Reynolds number of 1000 and a Mach number of 0.1 are set and when a Reynolds number of 100 and a Mach number of 0.01 are set. A velocity V (velocity in a Y-direction) on the X-axis shown in the lower left graph in FIG. 5 and a velocity U (velocity in an X-direction) on the Y-axis shown in the lower right graph well match with validated solutions indicated by circles or diamonds. Therefore, the fluid analyzing apparatus according to the embodiment of the present invention can analyze an incompressible fluid at high precision.

Figure 6:
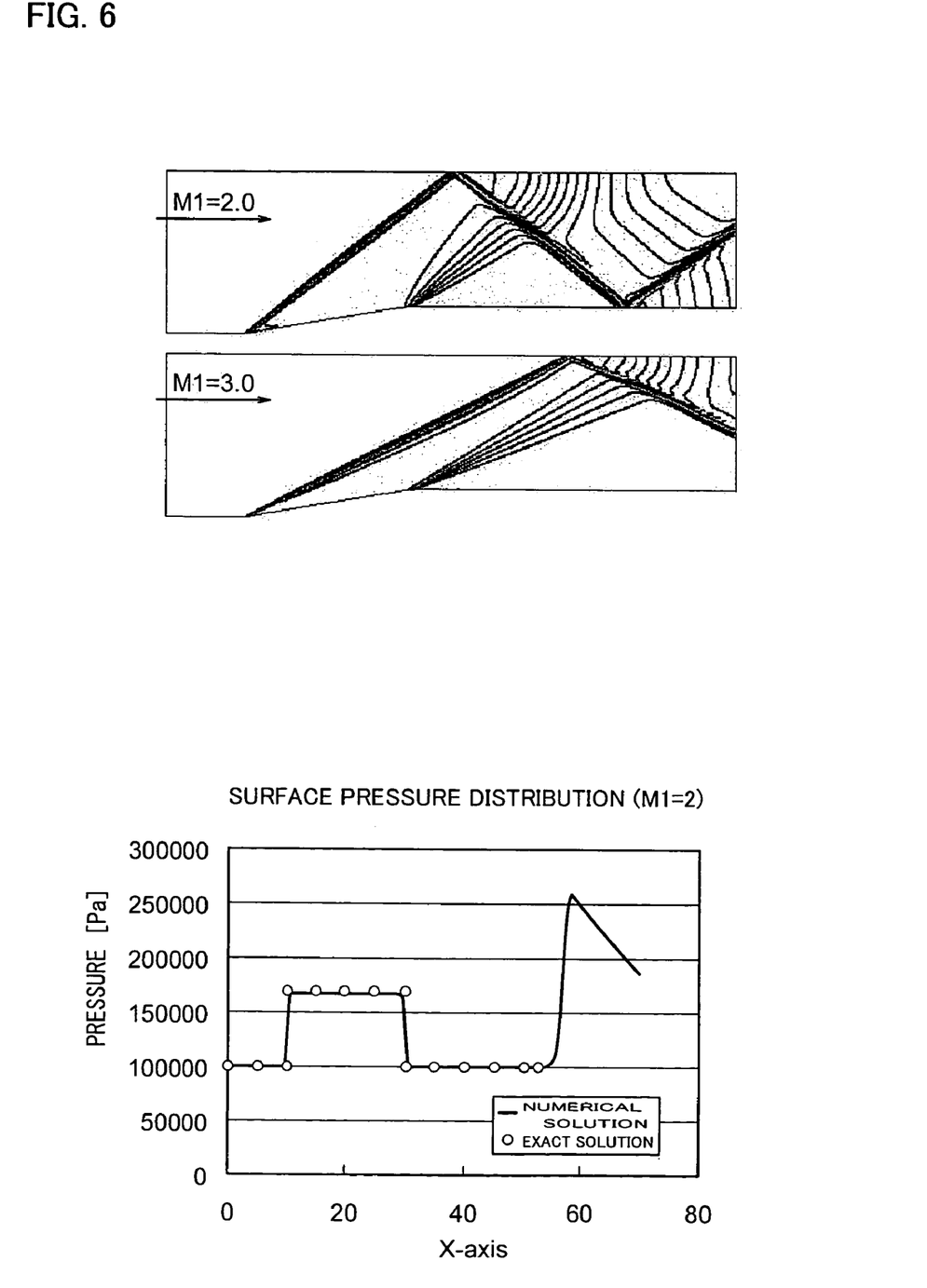
FIG. 6 shows diagrams and a graph showing results obtained by applying the present invention to an supersonic channel flow problem.

FIG. 6 shows results obtained by applying the present invention to a supersonic channel flow problem. The upper diagrams in FIG. 6 show a density contour obtained when an inlet Mach number is 2 and a density contour obtained when an inlet Mach number is 3. The lower diagram in FIG. 6 shows a pressure distribution of the lower surface, obtained when an inlet Mach number is 2. The pressure distribution well matches with a validated solution indicated by "◯". Therefore, the fluid analyzing apparatus according to the embodiment of the present invention can analyze such a compressible fluid at high precision.

Figure 7:
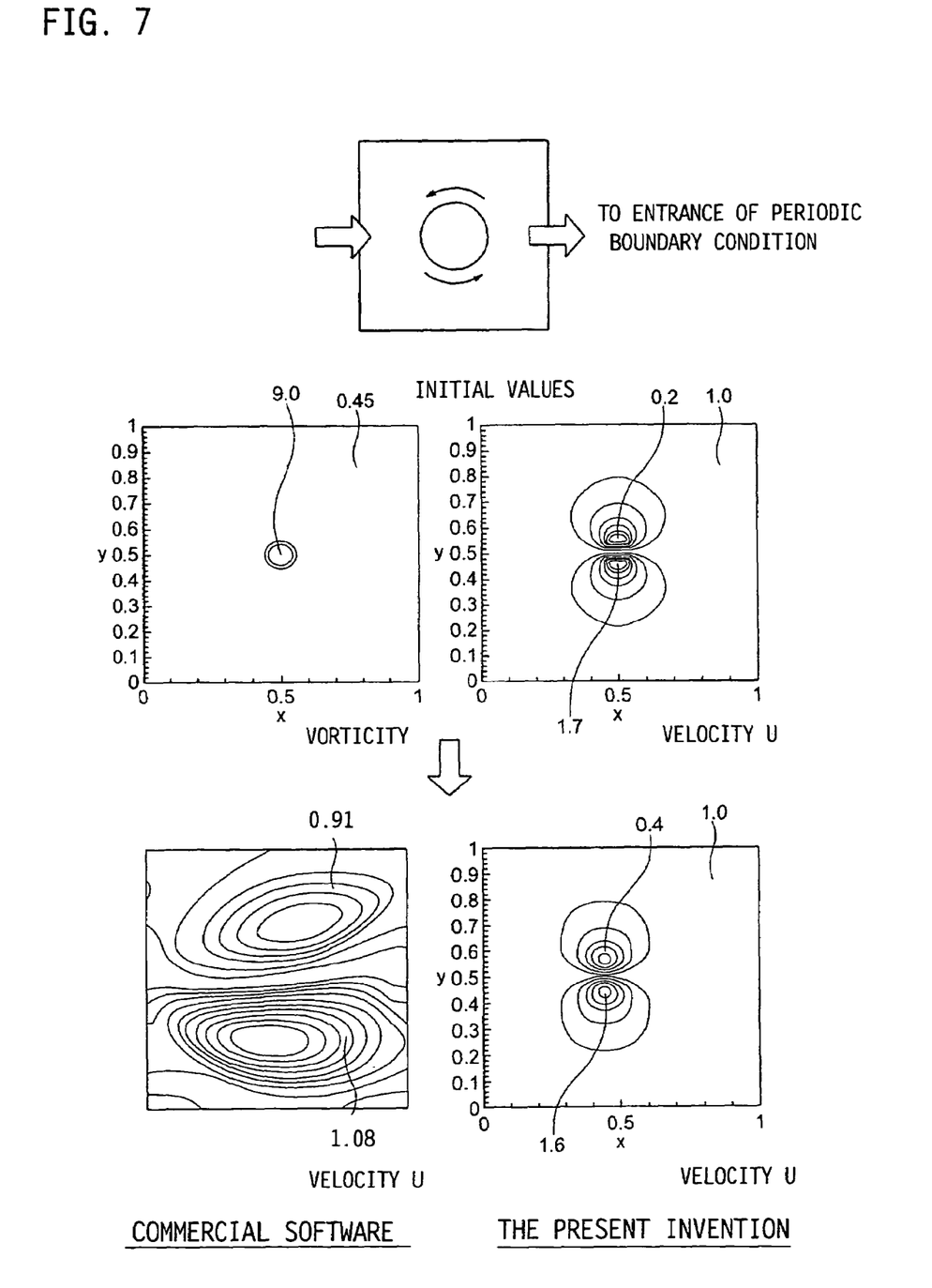
FIG. 7 shows diagrams and graphs showing results obtained by applying the present invention to a vortex movement problem of a vortex generated when a Rankine vortex is arranged in a free flow having a Mach number of 0.5.

FIG. 7 shows results obtained by applying the present invention to a vortex movement problem caused when a Rankine vortex is arranged in a free flow having a Mach number of 0.5. In analysis performed by using a commercial software and shown in the lower left graph, a vortex is diffused after three cycles. In contrast to this, in analysis performed by using the fluid analyzing apparatus according to the embodiment of the present invention and shown in the lower right graph, the shape of the vortex is held even after five cycles. Therefore, the fluid analyzing apparatus according to the embodiment of the present invention has low diffusiveness, and can analyze a boundary layer or a vortex at high precision.

What is claimed is:

1. A fluid analyzing apparatus comprising:
   an advection step density analyzing unit which uses an advection equation of a mass conservation equation to calculate a density in an advection step;
   an advection step internal energy analyzing unit which uses an advection equation of an internal energy equation to calculate an internal energy in the advection step;
   an advection step pressure analyzing unit which calculates a pressure developing after advection based on the density and the internal energy in the advection step;
   an advection step velocity analyzing unit which uses an equation obtained by adding a term of pressure gradient developing before advection to an advection equation of a momentum conservation equation to calculate a velocity in the advection step;
   a nonadvection step small perturbation analyzing unit which calculates a small perturbation from the pressure developing after advection in a nonadvection step based on the density, the internal energy, the pressure, and the velocity after the advection step;
   a nonadvection step velocity analyzing unit which calculates a velocity develping after a unit time has elapsed based the small perturbations in the nonadvection step;
   a nonadvection step density analyzing unit which calculates a density developing after a unit time has elapsed based on the velocity developing after the unit time has elapsed and the density in the advection step;
   a nonadvection step internal energy analyzing unit which calculates an internal energy developing after the unit time has elapsed based on the velocity developing after the unit time has elapsed and the density after the advection step; and
   an iterative calculation control unit which interates calculations performed from the advection step density analyzing unit to the nonadvection step internal energy analyzing unit in a predetermined order.

2. The fluid analyzing apparatus according to claim 1, wherein, when the advection step density analyzing unit and the advection step internal energy analyzing unit use an advection equation to perform calculation, approximated Riemann's solvers are applied.

3. The fluid analyzing apparatus according to claim 1, wherein the advection step pressure analyzing unit uses a relational expression of ideal gases to calculate a pressure developing after advection based on the density and the internal energy in the advection step.

4. The fluid analyzing apparatus according to claim 1, wherein the nonadvection step small perturbation analyzing unit uses a Poisson's equation of small perturbation.

5. A fluid analyzing method in which a fluid analyzing apparatus analyzes fluid, the fluid analyzing apparatus including an advection step density analyzing unit, an advection step internal energy analyzing unit, an advection step pressure analyzing unit, an advection step velocity analyzing unit, a nonadvection step small perturbation analyzing unit, a nonadvection step velocity analyzing unit, a nonadvection step density analyzing unit, a nonadvection step internal energy analyzing unit, and an iterative calculation control unit, the method comprising:

the step of causing the advection step density analyzing unit to use an advection equation of a mass conservation equation to calculate a density in an advection step;
the step of causing the advection step internal energy analyzing unit to use an advection equation of an internal energy equation to calculate an internal energy in the advection step;
the step of causing the advection step pressure analyzing unit to calculate a pressure developing after advection based on the density and the internal energy in the advection step;
the step of causing the advection step velocity analyzing unit to use an equation obtained by adding a term of pressure gradient developing before advection to an advection equation of a momentum conservation equation to calculate a velocity in an advection step;
the step of causing the nonadvection step small perturbation analyzing unit to calculate a small perturbation from the pressure developing after advection in a nonadvection step based on the density, the internal energy, the pressure, and the velocity after the advection step;
the step of causing the nonadvection step velocity analyzing unit to calculate a velocity developing after a unit time has elapsed based on the small perturbations in the nonadvection step;
the step of causing the nonadvection step density analyzing unit to calculate a density developing after a unit time has elapsed based on the velocity developing after the unit time has elapsed and the density after the advection step;
the step of causing the nonadvection step internal energy analyzing unit to calculate an internal energy developing after the unit time has elapsed based on the velocity developing after the unit time has elapsed and the density after the advection step; and
the step of causing the iterative calculation control unit to iterate calculations performed from the advection step density analyzing unit to the nonadvection step internal energy analyzing unit in a predetermined order.

6. The fluid analyzing method according to claim 5, wherein, in the step of calculating a density in the advection step and the step of calculating an internal energy in the advection step, when calculation is performed by using the advection equation, approximated Riemann's solvers are applied.

7. The fluid analyzing method according to claim 5, wherein, in the step of calculating a pressure developing after advection, the pressure developing after advection is calculated by the equation of state based on the density and the internal energy in the advection step.

8. The fluid analyzing method according to claim 5, wherein, in the step of calculating a small perturbation from the pressure developing after advection in the nonadvection step, a Poisson's equation of the small perturbation is used.

9. A fluid analyzing program embodied in a computer readable medium to operate a fluid analyzing apparatus to analyze fluid, the fluid analyzing apparatus including an advection step density analyzing unit, an advection step internal energy analyzing unit, an advection step pressure analyzing unit, an advection step velocity analyzing unit, a nonadvection step small perturbation analyzing unit, a nonadvection step velocity analyzing unit, a nonadvection step density analyzing unit, a nonadvection step internal energy analyzing unit, and an iterative calculation control unit, the program operation comprising:

the step of causing the advection step density analyzing unit to use an advection equation of a mass conservation equation to calculate a density in an advection step;

the step of causing the advection step internal energy analyzing unit to use an advection equation of an internal energy equation to calculate an internal energy in the advection step;

the step of causing the advection step pressure analyzing unit to calculate a pressure developing after advection based on the density and the internal energy in the advection step;

the step of causing the advection step velocity analyzing unit to use an equation obtained by adding a term of pressure gradient developing before advection to an advection equation of a momentum conservation equation to calculate a velocity in an advection step the step of causing the nonadvection step small perturbation analyzing unit to calculate a small perturbation from the pressure developing after advection in a nonadvection step based on the density, the internal energy, the pressure, and the velocity after the advection step;

the step of causing the nonadvection step velocity analyzing unit to calculate a velocity developing after a unit time has elapsed based on the small perturbations in the nonadvection step;

the step of causing the nonadvection step density analyzing unit to calculate a density developing after a unit time has elapsed based on the velocity developing after the unit time has elapsed and the density after the advection step;

the step of causing the nonadvection step internal energy analyzing unit to calculate an internal energy developing after the unit time has elapsed based on the velocity developing after the unit time has elapsed and the density after the advection step; and the step of causing the iterative calculation control unit to iterate calculations performed from the advection step density analyzing unit to the nonadvection step internal energy analyzing unit a predetermined order.

10. The fluid analyzing program according to claim 9, wherein, in the step of calculating a density in the advection step and the step of calculating an internal energy in the advection step, when calculation is performed by using the advection equation, approximated Riemann's solvers are applied.

11. The fluid analyzing program according to claim 9, wherein, in the step of calculating a pressure developing after advection, the pressure developing after advection is calculated by the equation of state based on the density and the internal energy in the advection step.

12. The fluid analyzing program according to claim 9, wherein, in the step of calculating a small perturbation from the pressure developing after advection in the nonadvection step, a Poisson's equation of the small perturbation is used.

* * * * *